US008500326B2

(12) United States Patent
Matsudo

(10) Patent No.: US 8,500,326 B2
(45) Date of Patent: Aug. 6, 2013

(54) PROBE FOR TEMPERATURE MEASUREMENT, TEMPERATURE MEASURING SYSTEM AND TEMPERATURE MEASURING METHOD USING THE SAME

(75) Inventor: Tatsuo Matsudo, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 249 days.

(21) Appl. No.: 13/044,705

(22) Filed: Mar. 10, 2011

(65) Prior Publication Data

US 2011/0222581 A1 Sep. 15, 2011

Related U.S. Application Data

(60) Provisional application No. 61/325,550, filed on Apr. 19, 2010.

(30) Foreign Application Priority Data

Mar. 12, 2010 (JP) .................................. 2010-055871

(51) Int. Cl.
*G01N 25/00* (2006.01)
(52) U.S. Cl.
USPC ............. 374/120; 374/130; 374/208; 374/45; 374/141
(58) Field of Classification Search
USPC .......................... 374/120, 130, 45, 141, 208
See application file for complete search history.

(56) References Cited

U.S. PATENT DOCUMENTS

| 4,435,092 | A | * | 3/1984 | Iuchi ............................. 374/129 |
| 5,282,017 | A | * | 1/1994 | Kasindorf et al. ............ 356/446 |
| 5,399,018 | A | * | 3/1995 | Hollander et al. ............ 374/121 |
| 5,683,180 | A | * | 11/1997 | De Lyon et al. .............. 374/161 |
| 8,096,704 | B2 | * | 1/2012 | Riza et al. ..................... 374/130 |
| 2005/0259716 | A1 | * | 11/2005 | Ito et al. ........................ 374/161 |
| 2006/0077394 | A1 | * | 4/2006 | Suzuki et al. ................. 356/479 |
| 2012/0251759 | A1 | * | 10/2012 | Yamawaku et al. ............ 428/58 |

FOREIGN PATENT DOCUMENTS

| CN | 2173394 | 8/1994 |
| CN | 101226082 A | 7/2008 |
| JP | 2003-307458 A | 10/2003 |

* cited by examiner

*Primary Examiner* — Mirellys Jagan
(74) *Attorney, Agent, or Firm* — Pearne & Gordon LLP

(57) ABSTRACT

A probe for temperature measurement uses interference of a low-coherence light beam. The probe includes a temperature acquiring member configured to be brought into contact with a surface of a temperature measurement target and thermally assimilate with the temperature measurement target; a light irradiating/receiving unit configured to irradiate a measurement light beam as a low-coherence light beam to the temperature acquiring member and receive reflected light beams from a front surface and a rear surface of the temperature acquiring member; and a housing configured to define a distance between the temperature acquiring member and the light irradiating/receiving unit to a preset length and isolate optical paths of the measurement light beam and the two reflected light beams from an atmosphere in which the temperature measurement target is placed.

11 Claims, 10 Drawing Sheets

PROBE FOR TEMPERATURE MEASUREMENT, TEMPERATURE MEASURING SYSTEM AND TEMPERATURE MEASURING METHOD USING THE SAME

CROSS-REFERENCE TO RELATED APPLICATION

This application claims the benefit of Japanese Patent Application No. 2010-055871 filed on Mar. 12, 2010 and U.S. Provisional Application Ser. No. 61/325,550 filed on Apr. 19, 2010, the entire disclosures of which are incorporated herein by reference.

FIELD OF THE INVENTION

The present disclosure relates to a probe for measuring a temperature based on interference of low-coherence light and also relates to a temperature measuring system and a temperature measuring method using the same.

BACKGROUND OF THE INVENTION

When various processes such as a plasma process are performed on various kinds of substrates such as a semiconductor wafer (hereinafter, simply referred to as a "wafer"), a temperature of a wafer and/or temperatures of components of a plasma processing apparatus are measured in order to perform the process precisely. Recently, there has been proposed a technique related to a low-coherence light interference thermometer for measuring a temperature of a temperature measurement target by irradiating low-coherence light to the temperature measurement target and measuring an interference between reflected light from a front surface and reflected light from a rear surface of the temperature measurement target (see, for example, Patent Document 1).
Patent Document 1: Japanese Patent Laid-open Publication No. 2003-307458

In the conventional temperature measurement technique using the low-coherence light interference thermometer, however, various conditions need to be satisfied. For example, the temperature measurement target needs to be transmissive to a part of measurement light; parallelism between the front surface and the rear surface of the temperature measurement target needs to be high; and the front surface and the rear surface need to be mirror-polished. Besides, there are many restrictions required for the temperature measurement target. Thus, the range of applications of the low-coherence light interference thermometer has not been so wide. Furthermore, a distance between a collimator for irradiating low-coherence light and the temperature measurement target, i.e., an optical path length needs to be set accurately. Even if an actual optical path length is slightly deviated from an appropriate optical path length, accurate temperature measurement cannot be performed. Thus, manipulation for setting the optical path length has been complicated and troublesome.

BRIEF SUMMARY OF THE INVENTION

In view of the foregoing, the present disclosure provides a probe for temperature measurement, for which a troublesome manipulation for setting an optical path length is not required and which provides few restrictions for a temperature measurement target and thus has a wide range of applications.

Further, the present disclosure also provides a temperature measuring system and a temperature measuring method using the same.

In accordance with one aspect of the present disclosure, there is provided a probe for temperature measurement based on interference of a low-coherence light beam. The probe includes a temperature acquiring member configured to be brought into contact with a surface of a temperature measurement target and thermally assimilate with the temperature measurement target; a light irradiating/receiving unit configured to irradiate a measurement light beam as a low-coherence light beam to the temperature acquiring member and receive reflected light beams from a front surface and a rear surface of the temperature acquiring member; and a housing configured to define a distance between the temperature acquiring member and the light irradiating/receiving unit to a preset length and isolate optical paths of the measurement light beam and the two reflected light beams from an atmosphere in which the temperature measurement target is placed.

In the probe for temperature measurement, the housing may define a positional relationship between the temperature acquiring member and the light irradiating/receiving unit so as to allow the measurement light beam irradiated from the light irradiating/receiving unit to be vertically incident on the front surface of the temperature acquiring member.

In the probe for temperature measurement, the temperature acquiring member may be a plate-shaped body made of a thermally conductive material which is transmissive to the low-coherence light beam, and the front surface and the rear surface of the temperature acquiring member may be parallel to each other and are mirror-polished.

In the probe for temperature measurement, the temperature acquiring member may include a through hole formed through the temperature acquiring member in a thickness direction thereof and opened to face a surface of the temperature measurement target; and a gas supply unit configured to supply air or a nonreactive gas toward the surface of the temperature measurement target through the through hole.

In the probe for temperature measurement, the probe may include a screw capable of adjusting the distance between the temperature acquiring member and the light irradiating/receiving unit.

In accordance with another aspect of the present disclosure, there is provided a low-coherence light interference temperature measurement system including the probe for temperature measurement as described above; and a light receiving device serving as a low-coherence light optical system connected with the light irradiating/receiving unit of the probe for temperature measurement.

In accordance with still another aspect of the present disclosure, there is provided a temperature measuring method using the probe for temperature measurement as described above. The method includes: bringing the temperature acquiring member into contact with the temperature measurement target; irradiating the measurement light beam toward the temperature acquiring member from the light irradiating/receiving unit and receiving the reflected light beams from the front surface and the rear surface of the temperature acquiring member by the light irradiating/receiving unit; transmitting the two reflected light beams received in the process of receiving the reflected light beams to a low-coherence light interference temperature measurement system connected with the light irradiating/receiving unit, and calculating a temperature of the temperature measurement target based on a difference between optical path lengths of the two reflected light beams and a predetermined relationship between the difference between the optical path lengths of the two reflected light beams and a temperature of the temperature acquiring member.

In the temperature measuring method, the method may include standing by till the temperature of the temperature acquiring member assimilates with the temperature of the temperature measurement target after bringing the temperature acquiring member into contact with the temperature measurement target.

In the temperature measuring method, when bringing the temperature acquiring member into contact with the temperature measurement target, a heat transfer sheet is provided between the temperature acquiring member and the temperature measurement target.

In the temperature measuring method, an outer periphery of the heat transfer sheet may be sealed by a sealing member, and a sealed space may be filled with air or a non-reactive gas via a through hole formed in the temperature acquiring member.

In the temperature measuring method, when irradiating the measurement light beam toward the temperature acquiring member, the distance between the light irradiating/receiving unit and the temperature acquiring member may be adjusted.

In accordance with the present disclosure, since the optical path length is previously defined by the housing, a troublesome manipulation for setting the optical path length is not required. Moreover, since the temperature of the temperature measurement target is measured indirectly by transferring the heat of the temperature measurement target to the temperature acquisition member, there are few restrictions on the temperature measurement target, and, thus, the range of applications can be widened.

DETAILED DESCRIPTION OF THE INVENTION

Hereinafter, there will be explained a low-coherence light interference temperature measurement system using a probe for temperature measurement in accordance with the present disclosure.

Figure 1:
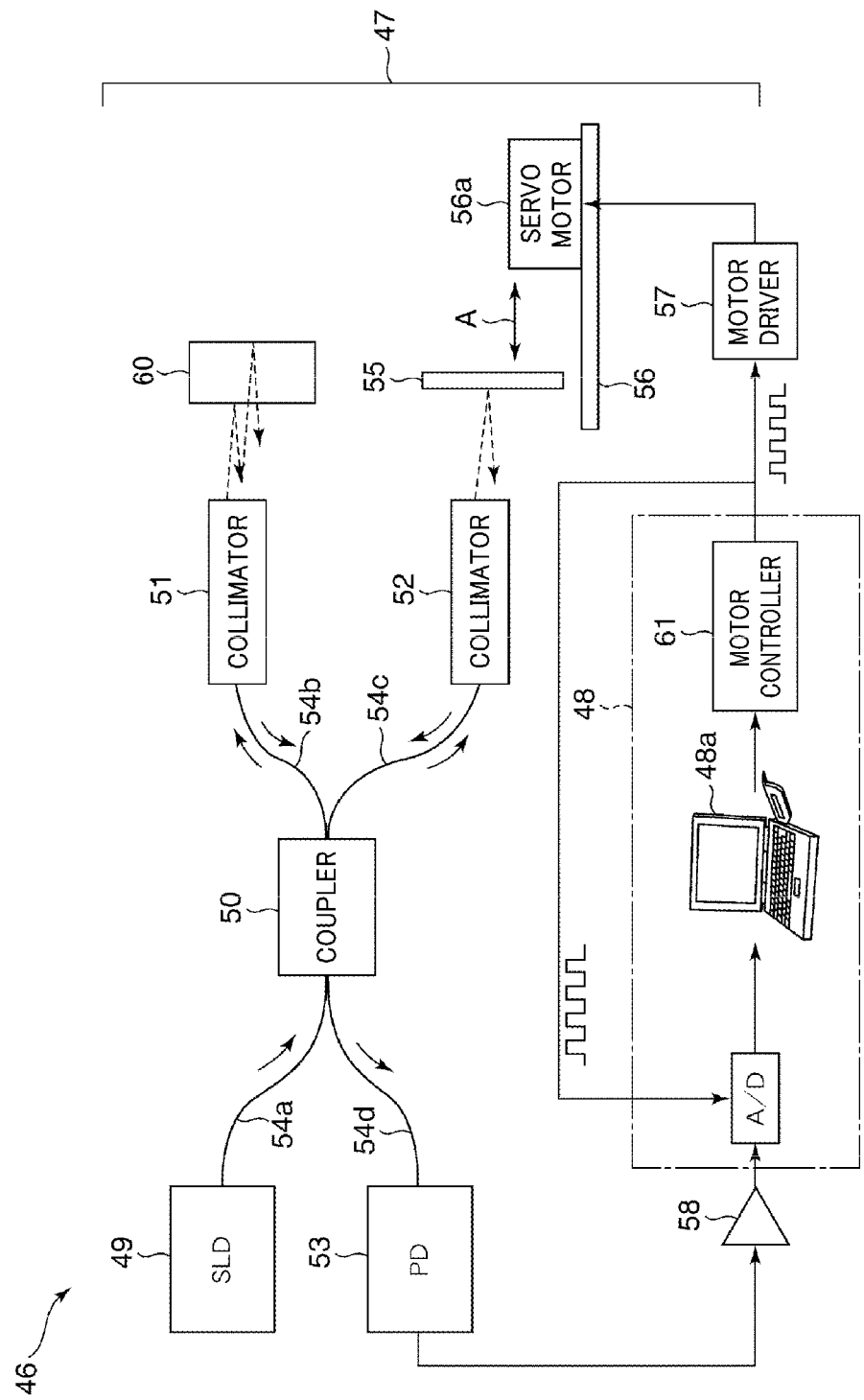
FIG. 1 is a block diagram schematically illustrating a configuration of a low-coherence light interference temperature measurement system.

FIG. 1 is a block diagram schematically showing a configuration of a low-coherence light interference temperature measurement system.

Referring to FIG. 1, a low-coherence light interference temperature measurement system 46 may include a low-coherence light optical system 47 that irradiates a low-coherence light beam to a temperature measurement target 60 and receives reflected light beams of the low-coherence light beam; and a temperature calculation device 48 that calculates a temperature of the temperature measurement target 60 based on the reflected light beams received by the low-coherence light optical system 47. When a light beam is irradiated from a single light source and is split into two light beams and wave trains of two light beams are difficult to be overlapped (wave trains of two light beams are difficult to interfere each other), the light beam is called as a low-coherence light beam. The low-coherence light beam has a short interference distance (coherence length).

The low-coherence light optical system 47 may include a super luminescent diode (SLD) 49 as a low-coherence light source; an optical fiber coupler 50 (hereinafter, referred to as "coupler") as a 2×2 splitter connected to the SLD 49; collimators 51 and 52 connected to the coupler 50; a photo detector (PD) 53 as a light receiving device connected to the coupler 50; and optical fibers 54a, 54b, 54c and 54d connecting the above-mentioned components.

The SLD 49 irradiates a low-coherence light beam having, for example, a central wavelength of about 1.55 μm or about 1.31 μm and a coherence length of about 50 μm at an output power of about 1.5 mW. The coupler 50 splits the low-coherence light beam from the SLD 49 into two light beams, and these two split low-coherence light beams are transmitted through the optical fibers 54b and 54c to the collimators 51 and 52, respectively. The collimators 51 and 52 irradiate the low-coherence light beams (a measurement light beam 64 and a reference light beam 65 to be described below) split by the coupler 50 to the temperature measurement target and a reference mirror 55, respectively. The PD 53 may include, for example, an InGaAs photo diode.

The low-coherence light optical system 47 may include the reference mirror 55 positioned in front of the collimator 52; a reference mirror driving stage 56 that horizontally moves the reference mirror 55 by a servomotor 56a in an irradiation direction of the low-coherence light beam from the collimator 52; a motor driver 57 that drives the servomotor 56a of the reference mirror driving stage 56; and an amplifier 58 connected with the PD 53 to amplify an output signal of the PD 53. The reference mirror 55 may include, by way of example, a corner cube prism or a planar mirror having a reflection surface.

The collimator 51 is positioned to face a front surface of the temperature measurement target 60. The collimator 51 irradiates a measurement light beam (measurement light beam 64 to be described below) of the two low-coherence light beams split by the coupler 50 toward the front surface of the temperature measurement target 60 and receives reflected light beams (reflected light beam 66a and reflected light beam 66b to be described below) from the front surface and a rear surface of the temperature measurement target 60 and transmits the reflected light beams to the PD 53.

The collimator 52 irradiates a reference light beam (reference light beam 65 to be described below) of the two low-coherence light beams split by the coupler 50 toward the reference mirror 55 and receives a reflected light beam (reflected light beam 68 to be described below) of the low-coherence light beam from the reference mirror 55 and transmits the reflected light beam to the PD 53.

The reference mirror driving stage 56 horizontally moves the reference mirror 55 in a direction indicated by an arrow A in FIG. 1 such that a reflection surface of the reference mirror 55 is kept perpendicular to the light beam irradiated from the collimator 52. Thus, the reference mirror 55 can be moved in a direction indicated by the arrow A (i.e., in an irradiation direction of the low-coherence light beam from the collimator 52).

The temperature calculation device 48 may include a PC 48a that controls the temperature calculation device 48 overall; a motor controller 61 that controls, via the motor driver 57, the servomotor 56a moving the reference mirror 55; and an A/D converter that performs an analogue-to-digital conversion while synchronizing an output signal of the PD 53 input to the A/D converter via the amplifier 58 of the low-coherence light optical system 47 with a control signal (driving pulse, for example) output from the motor controller 61 to the motor driver 57 or with a control signal output from a laser encoder or a linear scale configured to measure a position of the reference mirror 55 accurately.

Figure 2:
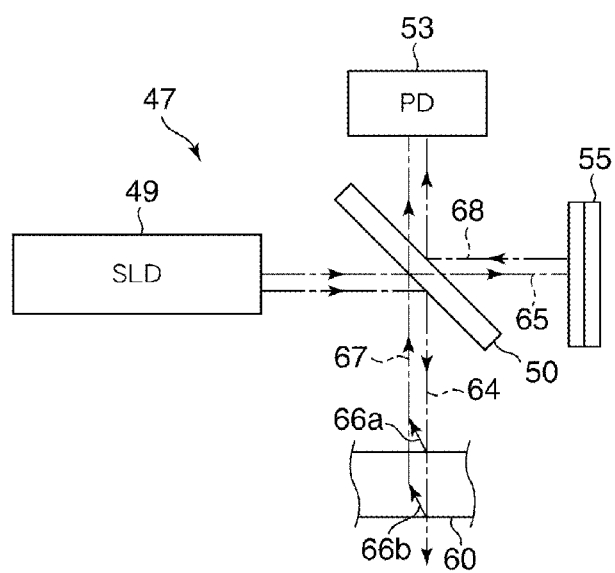
FIG. 2 is a diagram for describing a temperature measurement operation of a low-coherence light optical system of FIG. 1.

FIG. 2 is an explanatory diagram for describing a temperature measurement operation of the low-coherence light optical system of FIG. 1.

The low-coherence light optical system 47 may employ a Michelson interferometer structure as a basic structure. As depicted in FIG. 2, the low-coherence light beam irradiated from the SLD 49 is split into the measurement light beam 64 and the reference light beam 65 by the coupler 50 serving as a splitter, and the measurement light beam 64 is irradiated toward the temperature measurement target 60 and the reference light beam 65 is irradiated toward the reference mirror 55.

The measurement light beam 64 irradiated onto the temperature measurement target 60 is reflected from both the front surface and the rear surface of the temperature measurement target 60. Both a reflected light beam 66a from the front surface of the temperature measurement target 60 and a reflected light beam 66b from the rear surface of the temperature measurement target 60 are transmitted to the coupler 50 along a same optical path 67. Meanwhile, the reference light beam 65 irradiated onto the reference mirror 55 is reflected from the reflection surface and a reflected light beam 68 from the reflection surface is also transmitted to the coupler 50. Here, as described above, since the reference mirror 55 is horizontally moved in an irradiation direction of the reference light beam, the low-coherence light optical system 47 can change a length of the optical path of the reference light beam 65 and the reflected light beam 68.

In a case that the optical path length of the reference light beam 65 and the reflected light beam 68 is changed by horizontally moving the reference mirror 55, interference occurs between the reflected light beam 66a and the reflected light beam 68 when an optical path length of the measurement light beam 64 and the reflected light beam 66a is equal to that of the reference light beam 65 and the reflected light beam 68. Further, when the optical path length of the measurement light beam 64 and the reflected light beam 66b is equal to that of the reference light beam and the reflected light beam 68, interference occurs between the reflected light beam 66b and the reflected light beam 68. These interferences are detected by the PD 53. When detecting the interference, the PD 53 outputs an output signal.

Figure 3A:
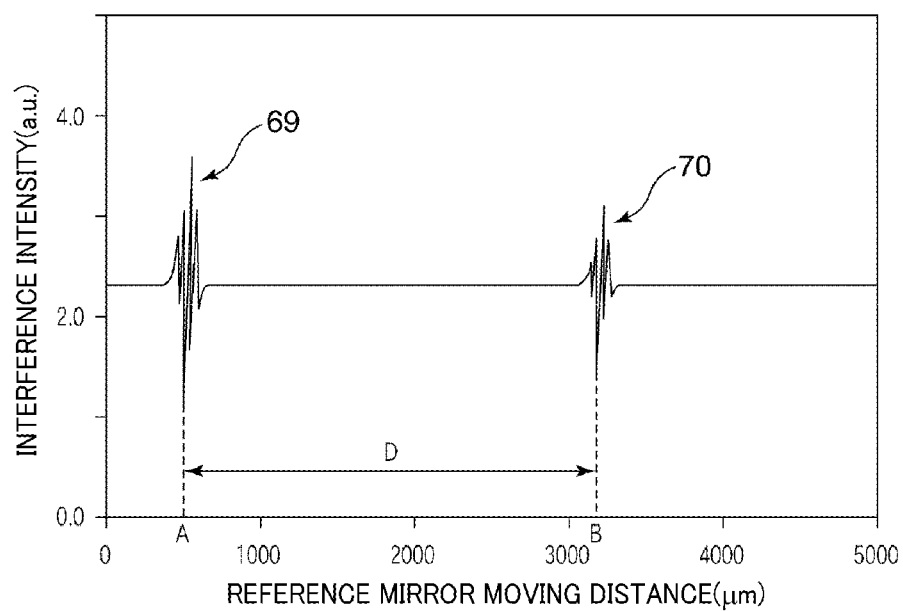
FIGS. 3A and 3B provide graphs each showing interference waveforms detected by a PD of FIG. 2 between reflected light from a wafer which is a temperature measurement target and reflected light from a reference mirror.
Figure 3B:
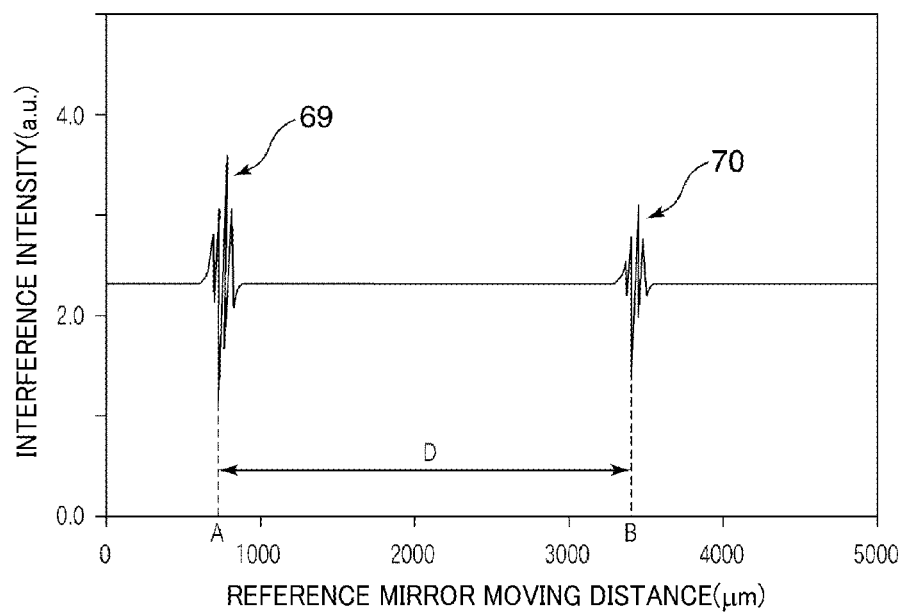

FIGS. 3A and 3B provide graphs each showing interference waveforms detected by a PD of FIG. 2 between the reflected light beams from the temperature measurement target 60 and the reflected light beam from the reference mirror. FIG. 3A shows interference waveforms obtained before a change in a temperature of the temperature measurement target 60 and FIG. 3B shows interference waveforms obtained after a change in a temperature of the temperature measurement target 60. In FIGS. 3A and 3B, the vertical axis indicates an interference intensity and the horizontal axis indicates a horizontal moving distance (hereinafter, simply referred to as "reference mirror moving distance") of the reference mirror 55 from a predetermined point.

As shown in the graph of FIG. 3A, when the reflected light beam 68 from the reference mirror 55 interferes with the reflected light beam 66a from the front surface of the temperature measurement target 60, an interference waveform 69 having a width of about 80 μm centered at, for example, an interference position A (where an interference intensity has a peak value of about 425 μm) is detected. When the reflected light beam 68 from the reference mirror 55 interferes with the reflected light beam 66b from the rear surface of the temperature measurement target 60, an interference waveform 70 having a width of about 80 μm centered at, for example, an interference position B (where an interference intensity has a peak value of about 3285 μm) is detected. The interference position A corresponds to the optical path length of the measurement light beam 64 and the reflected light beam 66a, and the interference position B corresponds to the optical path length of the measurement light beam 64 and the reflected light beam 66b. Therefore, a difference D between the interference position A and the interference position B corresponds to a difference (hereinafter, simply referred to as "optical path length difference") between the optical path length of the reflected light beam 66a and that of the reflected light beam 66b. The difference between the optical path length of the reflected light beam 66a and that of the reflected light beam 66b corresponds to an optical thickness of the temperature measurement target 60. Therefore, the difference D between the interference position A and the interference position B corresponds to the optical thickness of the temperature measurement target 60. That is, by detecting the interference between the reflected light beam and the reflected light beam 66a and the interference between the reflected light beam 68 and the reflected light beam 66b, it is possible to measure the optical thickness of the temperature measurement target 60.

If the temperature of the temperature measurement target 60 is changed, the thickness of the temperature measurement target 60 is changed due to thermal expansion (or contraction) and a refractive index is also changed, resulting in changes in the optical path length of the measurement light beam 64 and the reflected light beam 66a and the optical path length of the measurement light beam 64 an the reflected light beam 66b. Therefore, the interference position A of the reflected light beam 68 and the reflected light beam 66a and the interference position B of the reflected light beam 68 and the reflected light beam 66b shift from the interference positions shown in FIG. 3A. To be specific, as shown in the graph of FIG. 3B, the interference position A and the interference position B respectively shift from the interference positions shown in FIG. 3A. Since the interference position A and the interference position B shift depending on the temperature of the temperature measurement target 60, the difference D between the interference position A and the interference position B or the optical path length difference can be calculated, and the temperature of the temperature measurement target 60 can be measured based on the optical path length difference. In addition to a change in the optical thickness of the temperature measurement target 60, positional changes (such as extensions) of various components of the low-coherence light optical system 47 may be a cause for a change in an optical path length.

In the low-coherence light interference temperature measurement system 46, prior to measuring the temperature of the temperature measurement target 60, there is prepared in advance a temperature conversion database that stores temperatures of the temperature measurement target 60 associated with optical path length differences in a memory (not illustrated) included in the PC 48a of the temperature calculation device 48. Here, the temperature conversion database may store a table in which temperatures of the temperature measurement target 60 and optical path length differences are arranged in rows and columns. Accordingly, the memory of the PC 48a may store in advance a regression equation related to a temperature of a wafer W and an optical path difference. When a temperature of the temperature measurement target 60 is measured, the temperature calculation device 48 of the low-coherence light optical system 47 receives an output signal of the PD 53, i.e., a signal indicating the interference position A and the interference position B shown in FIGS. 3A and 3B. Subsequently, the temperature calculation device 48 calculates an optical path length difference based on the received signal and changes the optical path length difference into a corresponding temperature based on the temperature conversion database. Thus, a temperature of the temperature measurement target 60 can be measured.

A temperature measurement probe in accordance with an embodiment of the present disclosure is configured as a part of the low-coherence light optical system 47 of the above-described low-coherence light interference temperature measurement system. The temperature measurement probe may include a collimator 51 and a temperature acquiring member (hereinafter, referred to as a "contact member") configured to be brought into contact with a temperature measurement target W and thermally assimilate with the temperature measurement target W.

Below, a temperature measurement probe in accordance with a first embodiment of the present disclosure will be explained with reference to the accompanying drawings.

Figure 4:
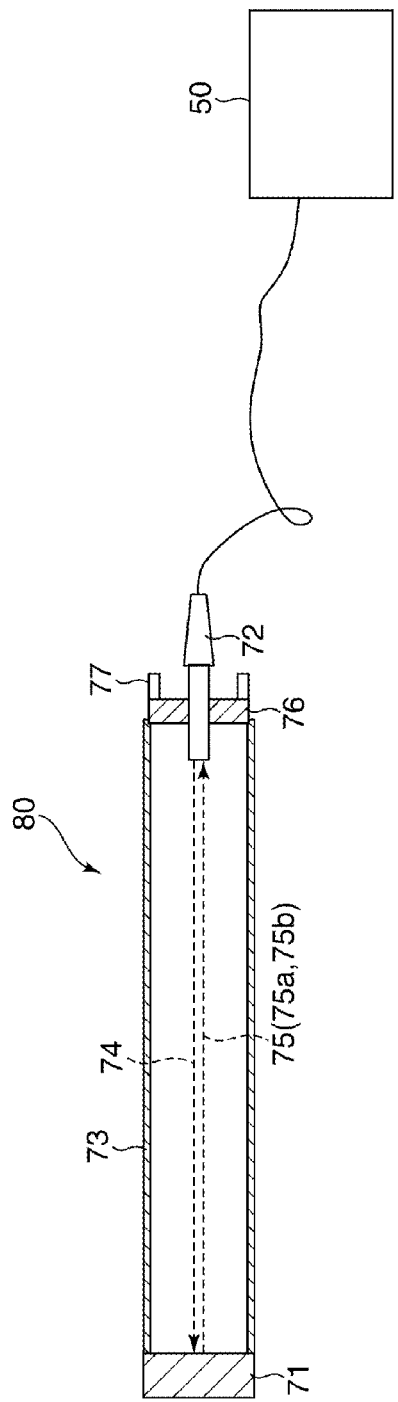
FIG. 4 is an explanatory diagram schematically illustrating a probe for temperature measurement in accordance with a first embodiment of the present disclosure.

FIG. 4 is an explanatory diagram schematically illustrating a configuration of the temperature measurement probe in accordance with the first embodiment.

In FIG. 4, a temperature measurement probe 80 may include a contact member 71 serving as a temperature acquiring member; a pigtail collimator (hereinafter, simply referred to as a "collimator") 72 serving as a light irradiating/receiving unit and configured to irradiate a measurement light beam 74 to the contact member 71 and receive reflected light beams 75; and a housing 73 configured to fix the contact member 71 and the collimator 72 at both ends thereof. The collimator 72 is fixed to one end of the housing 73 by a fixing member 76, and a screw 77 for finely adjusting a position of the collimator 72 and a distance between a leading end of the collimator 72 and the contact member 72 is provided at the fixing member 76. The collimator 72 is optically connected with the coupler 50 of the low-coherence light interference temperature measurement system 46 of FIG. 1 via an optical fiber.

The contact member 71 is a circular plate-shaped member made of a thermally conductive material, such as silicon (Si), which is transmissive to a low-coherence light beam. A front surface and a rear surface of the contact member 71 are formed in parallel to each other and are mirror-polished. The contact member 71 comes into contact with a temperature measurement target, receives heat from the temperature measurement target and thermally assimilates with the temperature measurement target. That is, a temperature of the contact member 71 becomes equal to a temperature of the temperature measurement target.

The collimator 72 irradiates one of low-coherence light beams split by the coupler 50 after irradiated from the SLD 49 of the low-coherence light interference temperature measurement system 46 to the contact member 71 along an optical path isolated by the housing 73 from an atmosphere in which the temperature measurement target is placed. The contact member 71 and the collimator 72 are aligned so as to allow the measurement light beam irradiated from the collimator 72 to be vertically incident on the front surface of the contact member 71, i.e., so as to obtain verticality (or right angles) between the measurement light beam and the front surface of the contact member 71. Further, an optical path length (preset length), i.e., a distance between the leading end of the collimator 72 and the front surface of the contact member 71 is a characteristic value determined depending on a material of the contact member 71, a wavelength of a used low-coherence light beam, or the like. The optical path length is previously set to a value capable of allowing accurate measurement of the temperature of the contact member 71 that has received heat from the temperature measurement target. The contact member 71 may be made of, e.g., a silicon (Si) plate.

The measurement light beam 74 irradiated from the collimator 72 is vertically incident on the front surface of the contact member 71, and a reflected light beam 75a from the front surface of the contact member 71 and a reflected light beam 75b from the rear surface of the contact member 71 are received by the collimator 72 along the same optical path as that of the measurement light beam 74. The reflected light beams 75 received by the collimator 72 are transmitted to the PD 53 of the low-coherence light interference temperature measurement system 46 via the coupler 50. Based on an optical path length difference between the reflected light beams 75a and 75b, the temperature calculation device 48 calculates the temperature of the contact member 71, i.e., the temperature of the temperature measurement target W.

Hereinafter, a temperature measuring method using the temperature measurement probe having the above-described configuration will be explained in accordance with the first embodiment.

Figure 5:
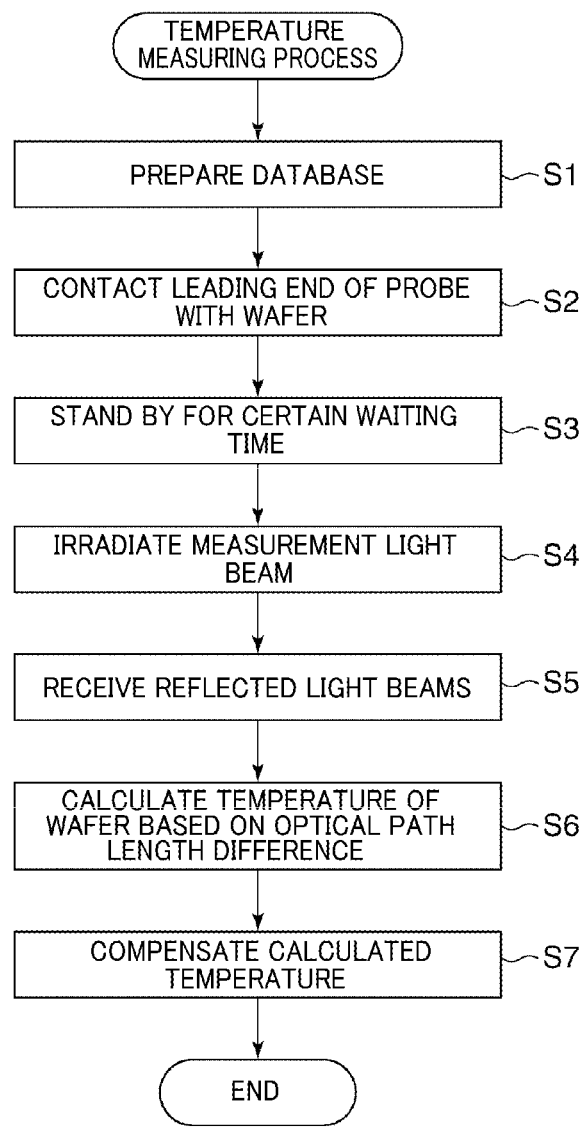
FIG. 5 is a flowchart for describing a temperature measuring method using the probe for temperature measurement in accordance with the first embodiment.

FIG. 5 provides a flowchart for describing the temperature measuring method using the temperature measurement probe in accordance with the first embodiment.

As shown in FIG. 5, in the temperature measuring method using the temperature measurement probe, a temperature measuring process may be performed as follows.

First, there is prepared in advance a temperature conversion database that stores, as for the same kind of material as that of the contact member 71 made of Si or the like, optical path length differences between reflected light beams and temperatures associated with the optical path length differences. The temperature conversion database is stored in a memory of the temperature calculation device 48 of the low-coherence light interference temperature measurement system 46 (step S1).

Figure 6:
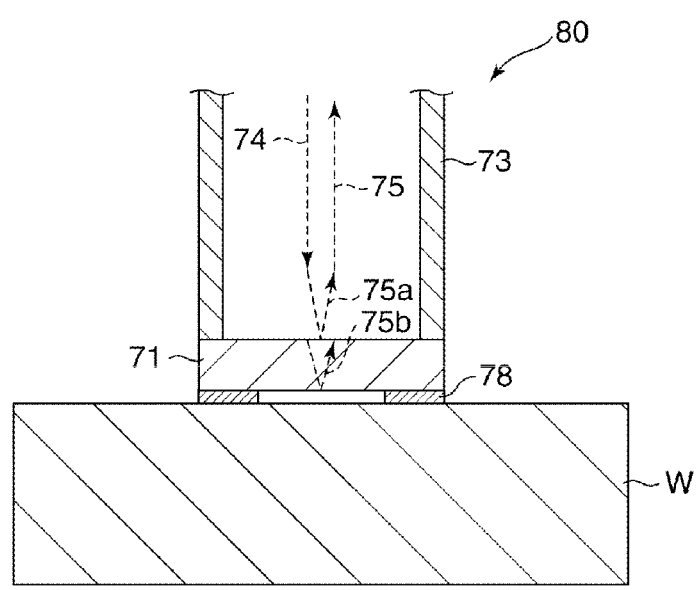
FIG. 6 is a diagram showing a positional relationship between a probe for temperature measurement and a temperature measurement target.

Subsequently, the leading end of the contact member 71 of the temperature measurement probe 80 is brought into contact with a surface of the temperature measurement target W via, e.g., a circular ring-shaped heat transfer sheet 78 (step S2). FIG. 6 is a diagram illustrating a positional relationship between the temperature measurement probe 80 and the temperature measurement target W. As depicted in FIG. 6, the contact member 71 of the temperature measurement probe 80 is in contact with the surface of the temperature measurement target W via the circular ring-shaped heat transfer sheet 78.

Subsequently, in the state shown in FIG. 6, a certain waiting time elapses till heat of the temperature measurement target W is transferred to the contact member 71 through the heat transfer sheet 78 and thus the temperature of the contact member 71 reaches the temperature of the temperature measurement target W (step S3). The waiting time may be calculated from, e.g., experiment values obtained by performing the same temperature measurement plural times.

After the certain waiting time passes by, the measurement light beam 74 is irradiated from the collimator 72 toward the contact member 71 (step S4). Thereafter, the reflected light beam 75*a* from the front surface of the contact member 71 and the reflected light beam 75*b* from the rear surface of the contact member 71 are received by the collimator 72 (step S5).

Afterward, the received reflected light beams 75*a* and 75*b* are transmitted to the coupler 50 and the PD 53 of the low-coherence light interference temperature measurement system 46 through optical fibers; an optical path length difference is calculated by the temperature calculation device 48 based on an output signal from the PD 53; and the temperature of the temperature measurement target W is calculated based on the optical path length difference (step S6). Then, if necessary, the calculated temperature is compensated by using a compensation value obtained by experiments, and the process is terminated.

In accordance with the process of FIG. 5, after the heat of the temperature measurement target W is transferred to the contact member 71 having the parallel and mirror-polished front and rear surfaces, the temperature of the contact member 71 is measured. In this way, the temperature of the temperature measurement target W can be calculated indirectly.

In accordance with the present embodiment, since the circular ring-shaped member made of, e.g., silicon (Si) and having parallel and mirror-polished front and rear surfaces is used as the contact member, most of conventional restrictions required for the temperature measurement target become unnecessary. Thus, the range of applications of the low-coherence light interference temperature measurement system can be greatly expanded.

In accordance with the present embodiment, the optical path length defined as the distance between the contact member 71 and the collimator 72 is previously set to a preset valve capable of allowing acquisition of an accurate measurement result. Accordingly, an initial setup (initializing) for setting an optical path length for every temperature measurement becomes unnecessary. Moreover, since the verticality between an irradiated light beam and the contact member is accurately set so as to allow the measurement light beam irradiated from the collimator 72 to be perpendicularly incident on the contact member 71, adjustment of the angle of the measurement light beam also becomes unnecessary. Accordingly, initializing for adjusting the verticality between the temperature measurement target and the measurement light beam is not necessary. Moreover, since the temperature conversion database is prepared in advance, it becomes unnecessary to perform initializing for measuring a wafer temperature before the wafer temperature changes.

Further, in accordance with the present embodiment, the optical path of the measurement light beam irradiated from the collimator 72 and the optical paths of the reflected light beams from the contact member 71 are positioned within the housing 73 and isolated from an atmosphere in which the temperature measurement target W is located. Accordingly, fluctuation of the measurement light beam and the reflected light beams due to external factors can be prevented, so that measurement accuracy can be improved.

Furthermore, in accordance with the present embodiment, there is provided the screw 77 for finely adjusting the distance between the leading end of the collimator 72 and the contact member 71. Accordingly, when an actual optical path length is deviated from an optimum length, it is possible to adjust the optical path length to the optimum length.

Moreover, since the temperature measurement probe 80 in accordance with the present embodiment is not affected by a high frequency power, the temperature of the temperature measurement target W can be accurately measured even if the temperature measurement target W is placed in an atmosphere to which the high frequency power is applied.

In accordance with the present embodiment, if it takes a long waiting time until the temperature of the contact member 71 reaches the temperature of the temperature measurement target W, an optical path length difference can be calculated at a certain time point before the temperature of the contact member 71 becomes equal to the temperature of the temperature measurement target W, and the temperature of the temperature measurement target W can be calculated based on the optical path length difference. Thereafter, the calculated temperature may be compensated by using a compensation value obtained through experiments.

In the present embodiment, the contact member 71 is made of a material, such as, silicon, which is transmissive to a low-coherence light beam and having a temperature dependency (i.e., a thickness or a refractive index of the material varies as the temperature changes). However, the contact member 71 may be made of e.g., sapphire, quartz, ZnSe or the like instead of silicon.

In the present embodiment, the inside of the housing 73 may be a vacuum or be filled with air or a nonreactive gas. Desirably, the housing 73 of the temperature measurement probe 80 may have a small exterior size, e.g., about 2 mm$\phi$ to about 6 mm$\phi$.

In the present embodiment, although the circular ring-shaped heat transfer sheet 78 is used as the heat transfer sheet provided between the contact member 71 and the temperature measurement target W, a circular plate-shaped heat transfer sheet may be used instead of the circular ring-shaped heat transfer sheet. Even in such a case, the same effect as described in the above embodiment can be achieved.

Now, a temperature measurement probe and a temperature measuring method in accordance with a second embodiment of the present disclosure will be discussed.

The aforementioned temperature measuring method in accordance with the first embodiment may be performed when the temperature measurement target W is placed in the atmosphere. When the temperature measurement target W is placed in a depressurized state below the atmospheric pressure (hereinafter, referred to as a "vacuum atmosphere"), temperature measurement may be performed as follows by using a temperature measurement probe to be described hereinafter.

Figure 7A:
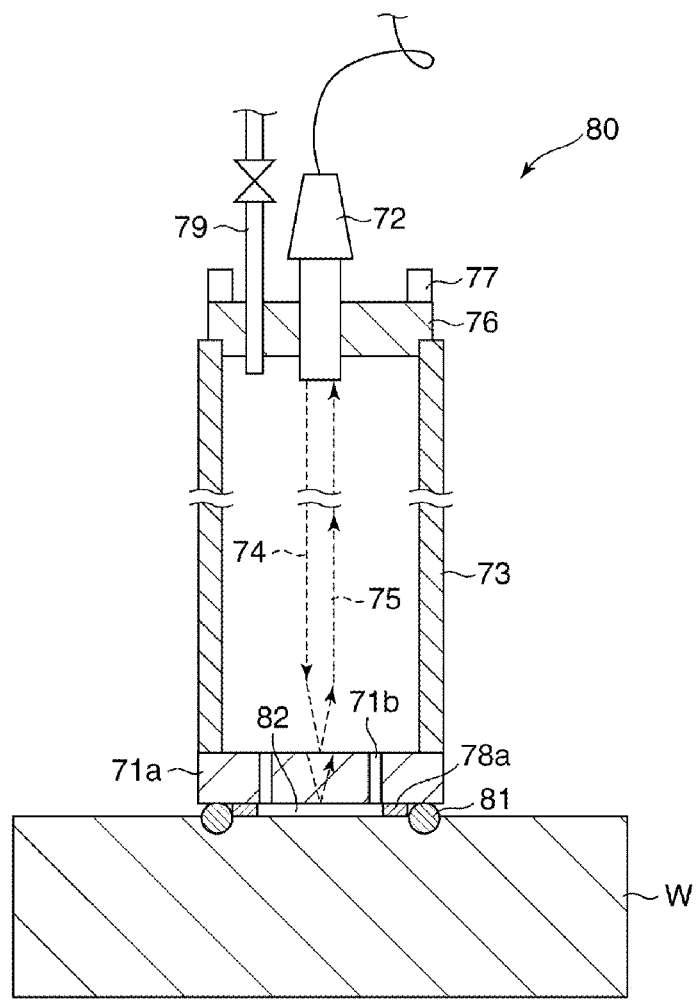
FIGS. 7A and 7B are diagrams schematically illustrating a configuration of a probe for temperature measurement in accordance with a second embodiment of the present disclosure.
Figure 7B:
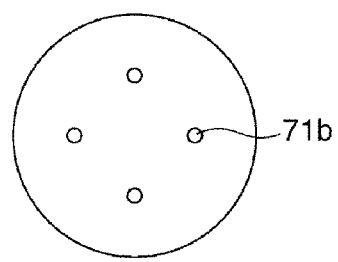

FIGS. 7A and 7B are diagrams schematically illustrating a configuration of a temperature measurement probe in accordance with the second embodiment. FIG. 7A is a longitudinal cross sectional view and FIG. 7B is a plane view of a contact member shown in FIG. 7A.

As depicted in FIG. 7A, a temperature measurement probe 80 in accordance with this second embodiment is different from the temperature measurement probe (FIG. 4) in accordance with the first embodiment in that a contact member 71a is provided with a multiple number of through holes 71b bored in a thickness direction thereof, and a gas supply pipe 79 as a gas introducing member for introducing air or a nonreactive gas into a housing 73 is installed at a fixing member 76.

The gas supply pipe 79 may introduce, e.g., air or a nonreactive gas into the housing 73 from a non-illustrated gas supply source. Further, in this second embodiment, although four through holes 71b are shown in FIG. 7B, the number of the through holes 71b may not be particularly limited. That is, one or more through holes may be provided.

A temperature of a temperature measurement target W placed in a vacuum atmosphere, e.g., in a chamber of a substrate processing apparatus will be measured as follows by using the temperature measurement probe having the above-described configuration.

There is prepared in advance a temperature conversion database that stores, as for the same kind of material (Si or the like) as that of the contact member 71a, optical path length differences and temperatures associated with the optical path length differences. The temperature conversion database is stored in a memory of the temperature calculation device 48 of the low-coherence light interference temperature measurement system 46.

Then, as illustrated in FIG. 7A, the contact member 71a is brought into contact with the temperature measurement target W via a circular ring-shaped heat transfer sheet 78a and an O-ring 81 that are provided between the contact member 71a of the temperature measurement probe 80 and the temperature measurement target W. The heat transfer sheet 78a has a size smaller than an exterior size of the contact member 71a and capable of surrounding all of the through holes 71b, and the O-ring 81 serves as a sealing member for surrounding an outer periphery of the heat transfer sheet 78a. Subsequently, for example, air is introduced into the housing 73 from the gas supply pipe 79. The air is then introduced into a space surrounded by the contact member 71a, the temperature measurement target W and the O-ring 81 via the through holes 71b of the contact member 71a, so that an air layer 82 is formed.

Then, a certain waiting time elapses till heat of the temperature measurement target W is transferred to the contact member 71a through the air layer 82 and thus the temperature of the contact member 71 reaches the temperature of the temperature measurement target W. Afterward, as in the first embodiment, a measurement light beam 74 is irradiated from a collimator 72, and the temperature of the temperature measurement target W is measured in the same way as the aforementioned temperature measuring method in accordance with the first embodiment.

In accordance with the second embodiment, the contact member 71a and the temperature measurement target W come into contact with each other via the circular-ring shaped heat transfer sheet 78a having the smaller size than that of the contact member 71a and capable of surrounding all of the through holes 71b and via the O-ring 81 serving as the sealing member for surrounding the outer periphery of the heat transfer sheet 78a. Further, the temperature measurement of the temperature measurement target W is performed after the air layer 82 is formed by introducing the air into the space surrounded by the contact member 71a, the temperature measurement target W and the O-ring 81. In this configuration, the air layer 82 functions as a heat transfer layer. Accordingly, it is possible to prevent generation of heat resistance that might be caused by a heat insulating vacuum layer. Accordingly, even if the temperature measurement target W is placed in the vacuum atmosphere, the temperature of the temperature measurement target W can be measured accurately.

In the second embodiment, although the circular ring-shaped heat transfer sheet capable of surrounding the multiple number of through holes 71b of the contact member 71a is used as the heat transfer sheet, a circular plate-shaped heat transfer sheet having a size capable of being surrounded by the through holes 71b may be used instead. In such a case, a circular ring-shaped space may be formed between the circular plate-shaped heat transfer sheet and the O-ring 81, and an air layer may be formed by filling the circular ring-shaped space with air. With this configuration, the same effect as described in the temperature measuring method in accordance with the second embodiment can be achieved.

Now, there will be explained a modification example of the temperature measuring method using the temperature measurement probe (FIG. 4) in accordance with the first embodiment.

Figure 8:
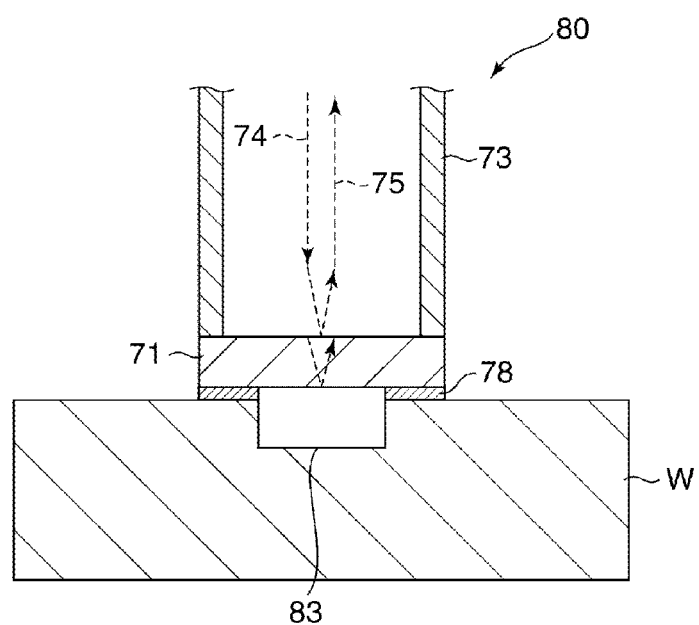
FIG. 8 is an explanatory diagram for describing a modification example of the temperature measuring method using the probe for temperature measurement in accordance with the first embodiment.

FIG. 8 is an explanatory diagram illustrating a modification example of the temperature measuring method using the temperature measurement probe in accordance with the first embodiment.

In FIG. 8, a recess 83 such as, a groove is provided in a surface of a temperature measurement target W. When the surface of the temperature measurement target is not flat as in this example, the contact member 71 may be brought into contact with the temperature measurement target W via, e.g., the circular ring-shaped heat transfer sheet 78 that is provided to surround the recess 83. Then, a temperature of the temperature measurement target W can be measured in the same method as the temperature measuring method in accordance with the first embodiment.

In accordance with this modification example, the contact member 71 and the temperature measurement target W are brought into contact with each other while the recess 83 is surrounded by the circular ring-shaped heat transfer sheet 78. Accordingly, even if the recess 83 is present in the surface of the temperature measurement target W, the temperature of a wafer can still be measured while the influence of the recess is minimized.

Now, there will be explained a modification example of the temperature measuring method using the temperature measurement probe in accordance with the second embodiment.

Figure 9A:
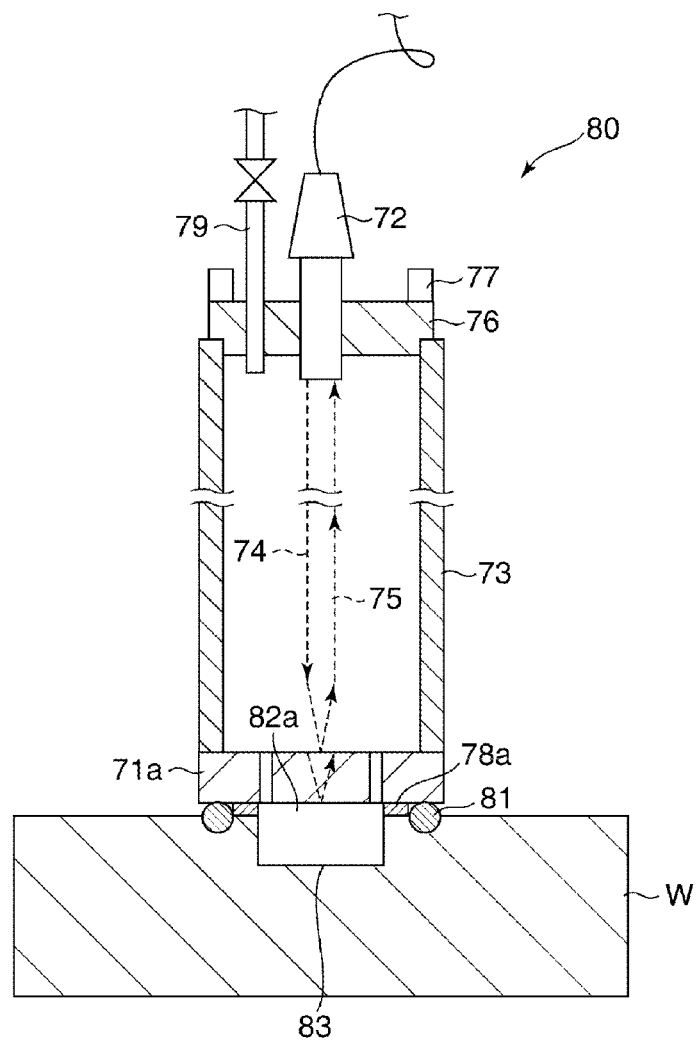
FIGS. 9A and 9B are explanatory diagrams for describing a modification example of the temperature measuring method using the probe for temperature measurement in accordance with the second embodiment.
Figure 9B:
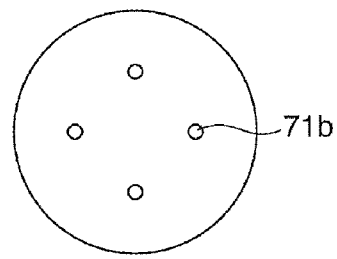

FIGS. 9A and 9B are explanatory diagrams illustrating the modification example of the temperature measuring method using the temperature measurement probe in accordance with the second embodiment. FIG. 9A is a longitudinal cross sectional view and FIG. 9B is a plane view of a contact member shown in FIG. 9A. Further, FIG. 10 is a plane view showing a contact position of the temperature measurement probe on the temperature measurement target W.

The temperature measuring method illustrated in FIGS. 9A and 9B is different from the temperature measuring method shown in FIG. 8 in that the temperature measurement target W is placed in a vacuum atmosphere; the heat transfer sheet 78a having the smaller exterior size than that of the heat transfer sheet 78 is used and the outer periphery of the heat transfer sheet 78a is surrounded by the O-ring 81; and an air layer 82a is formed by introducing air from the gas supply pipe 79 into a space surrounded by the contact member 71a, the recess 83 of the temperature measurement target W and the O-ring 81.

Figure 10:
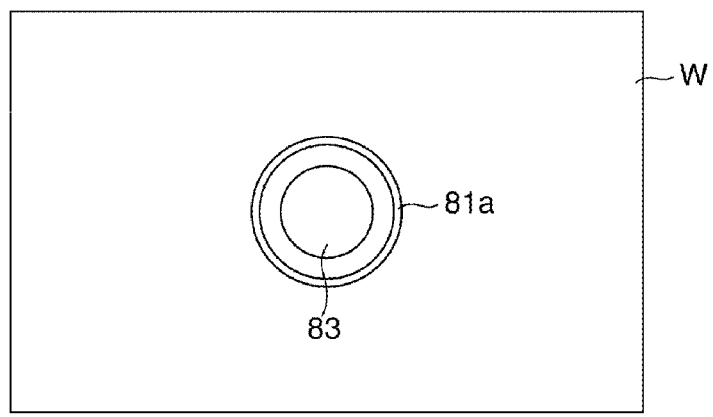
FIG. 10 is a plane view illustrating a contact position of a probe for temperature measurement on a temperature measurement target.

In FIG. 10, an O-ring groove 81a is formed around the recess 83. In this way, the O-ring groove 81a for fitting therein the O-ring 81 as a sealing member may be formed in advance in a surface of the temperature measurement target W, and the contact member 71a and the temperature measurement target W may be brought into contact each other while the O-ring 81 is fitted in the O-ring groove 81a. With this configuration, a sealing property can be improved. Further, the shape of the recess 83 may not be limited to a circular shape, and the number of the recess 83 may be one or more.

The contact member 71a of the temperature measurement probe 80 is brought into contact with the temperature measurement target W, and after a lapse of a certain waiting time, the temperature of the temperature measurement target W is measured in the same method as described in the above embodiments.

In accordance with the modification example of the second embodiment, in case that the temperature measurement target W having the recess 83 is placed in the vacuum atmosphere, the air layer 82a is formed by filling the recess 83 with air, and heat of the temperature measurement target W is efficiently transferred to the contact member 71a via the air layer 82a and the heat transfer sheet 78a. Thus, even in this case, the temperature of the temperature measurement target W can be measured accurately in an indirect manner.

In the modification example of the second embodiment, the temperature measuring method has been described for the case that the temperature measurement target W has one recess. However, the temperature measurement target W may have two or more recesses. In such a case, the recesses may be surrounded by the O-ring 81, and an area of the temperature measurement target W where the recesses are not formed may be brought into contact with a contact member 71a via a heat transfer sheet. Further, a heat transfer layer may be formed by filling a space surrounded by the contact member 71a, the temperature measurement target W and the O-ring 81 with air or a non-reactive gas, and the temperature of the temperature measurement target W may be measured as in the same manner as described in the above embodiments.

In accordance with this modification example of the second embodiment, even in case the temperature measurement target W has two or more recesses, the heat transfer layer may be formed by using the recesses, and, thus, the temperature of the temperature measurement target W can be certainly transferred to the contact member 71a and thus can be measured accurately.

While various embodiments of the present disclosure have been described herein, the present disclosure is not limited thereto.

What is claimed is:

1. A probe for temperature measurement based on interference of a low-coherence light beam, comprising:
    a temperature acquiring member configured to be brought into contact with a surface of a temperature measurement target and thermally assimilate with the temperature measurement target;
    a light irradiating/receiving unit configured to irradiate a measurement light beam as a low-coherence light beam to the temperature acquiring member and receive reflected light beams from a front surface and a rear surface of the temperature acquiring member; and
    a housing configured to define a distance between the temperature acquiring member and the light irradiating/receiving unit to a preset length and isolate optical paths of the measurement light beam and the two reflected light beams from an atmosphere in which the temperature measurement target is placed.

2. The probe for temperature measurement of claim 1, wherein the housing defines a positional relationship between the temperature acquiring member and the light irradiating/receiving unit so as to allow the measurement light beam irradiated from the light irradiating/receiving unit to be vertically incident on the front surface of the temperature acquiring member.

3. The probe for temperature measurement of claim 1, wherein the temperature acquiring member is a plate-shaped body made of a thermally conductive material which is transmissive to the low-coherence light beam, and the front surface and the rear surface of the temperature acquiring member are parallel to each other and are mirror-polished.

4. The probe for temperature measurement of claim 1, wherein the temperature acquiring member comprises:
    a through hole formed through the temperature acquiring member in a thickness direction thereof and opened to face a surface of the temperature measurement target; and
    a gas supply unit configured to supply air or a nonreactive gas toward the surface of the temperature measurement target through the through hole.

5. The probe for temperature measurement of claim 1, further comprising:
    a screw capable of adjusting the distance between the temperature acquiring member and the light irradiating/receiving unit.

6. A low-coherence light interference temperature measurement system comprising:
    the probe for temperature measurement as claimed in claim 1; and
    a light receiving device serving as a low-coherence light optical system connected with the light irradiating/receiving unit of the probe for temperature measurement.

7. A temperature measuring method using the probe for temperature measurement as claimed in claim 1, the method comprising:
    bringing the temperature acquiring member into contact with the temperature measurement target;
    irradiating the measurement light beam toward the temperature acquiring member from the light irradiating/receiving unit and receiving the reflected light beams from the front surface and the rear surface of the temperature acquiring member by the light irradiating/receiving unit;
    transmitting the two reflected light beams received in the process of receiving the reflected light beams to a low-coherence light interference temperature measurement system connected with the light irradiating/receiving unit, and calculating a temperature of the temperature measurement target based on a difference between optical path lengths of the two reflected light beams and a predetermined relationship between the difference between the optical path lengths of the two reflected light beams and a temperature of the temperature acquiring member.

8. The temperature measuring method of claim 7, further comprising:
    standing by until the temperature of the temperature acquiring member assimilates with the temperature of the temperature measurement target after bringing the temperature acquiring member into contact with the temperature measurement target.

9. The temperature measuring method of claim 7, wherein when irradiating the measurement light beam toward the temperature acquiring member, the distance between the light irradiating/receiving unit and the temperature acquiring member is adjusted.

10. The temperature measuring method of claim 7, wherein when bringing the temperature acquiring member into contact with the temperature measurement target, a heat transfer sheet is provided between the temperature acquiring member and the temperature measurement target.

11. The temperature measuring method of claim 10, wherein an outer periphery of the heat transfer sheet is sealed by a sealing member, and a sealed space is filled with air or a non-reactive gas via a through hole formed in the temperature acquiring member.

* * * * *